(12) United States Patent
Zeng et al.

(10) Patent No.: US 10,838,174 B2
(45) Date of Patent: Nov. 17, 2020

(54) MINIATURE IMAGING LENS

(71) Applicant: JIANGXI LIANYI OPTICS CO., LTD., Jiangxi (CN)

(72) Inventors: Jiyong Zeng, Jiangxi (CN); Tsuyoshi Kakimoto, Jiangxi (CN); Haojie Zeng, Jiangxi (CN); Xuming Liu, Jiangxi (CN)

(73) Assignee: JIANGXI LIANYI OPTICS CO., LTD., Jiangxi (CN)

( * ) Notice: Subject to any disclaimer, the term of this patent is extended or adjusted under 35 U.S.C. 154(b) by 277 days.

(21) Appl. No.: 16/147,943

(22) Filed: Oct. 1, 2018

(65) Prior Publication Data
US 2019/0302425 A1  Oct. 3, 2019

(30) Foreign Application Priority Data
Apr. 3, 2018 (CN) .......................... 2018 1 0291060

(51) Int. Cl.
*G02B 13/00* (2006.01)
*G02B 9/62* (2006.01)
*G02B 5/20* (2006.01)

(52) U.S. Cl.
CPC ........... *G02B 13/0045* (2013.01); *G02B 9/62* (2013.01); *G02B 5/20* (2013.01)

(58) Field of Classification Search
CPC ......... G02B 13/0045; G02B 5/20; G02B 9/62
See application file for complete search history.

(56) References Cited

U.S. PATENT DOCUMENTS

2013/0342918 A1* 12/2013 Kubota ............. G02B 13/0045
                                                                359/713

* cited by examiner

*Primary Examiner* — Jack Dinh
(74) *Attorney, Agent, or Firm* — Hodgson Russ LLP (57) ABSTRACT

The present disclosure provides a miniature imaging lens including, along an optical axis in order from an object side to an image side, a first lens having a positive refractive power; a second lens having a negative refractive power; a third lens having a positive refractive power; a fourth lens having a negative refractive power; a fifth lens having a positive refractive power; a sixth lens having a negative refractive power; and a filter. The miniature imaging lens satisfies a conditional expression $2<f_1/R_1<3$, where $f_1$ denotes a focal length of the first lens, and $R_1$ denotes a radius of curvature of the object-side surface of the first lens.

10 Claims, 7 Drawing Sheets

MINIATURE IMAGING LENS

CROSS REFERENCE TO RELATED APPLICATION

This application is based upon and claims priority to Chinese Patent Application No. 201810291060.1, filed on Apr. 3, 2018, the entire contents of which are incorporated herein by reference.

FIELD

The present disclosure relates to the field of camera technologies, and more particularly to a miniature imaging lens.

BACKGROUND

At present, imaging lenses have become standard configurations for electronic devices (such as smart phones and cameras), and imaging lenses even have become a primary indicator when consumers purchase the electronic devices. In recent years, with the continuous development of design level and manufacture technology, the imaging lenses have continuously developed towards a direction of small sizes, light weights and high performances. However, as the requirement for the image quality is increased, the size of the chip used is increased accordingly, resulting in an increase in the size of the imaging lens, which runs counter to the development trend of miniaturization of the imaging lens.

Furthermore, intelligent portable electronic devices in the related art are often used for shooting portraits or close views, which also puts a higher requirement on sharpness of the imaging lens. As known, the greater the aperture of the lens is, the greater the amount of light entering is, the shutter speed can be effectively increased, and moreover, the better the effect of background blur is, the better the imaging quality in dim conditions is. However, the f-number Fno of the lens in the related art is generally 2.0 or more than 2.0, although miniaturization requirement can be satisfied, the imaging quality of the lens in the case of insufficient light cannot be guaranteed.

SUMMARY

A miniature imaging lens is provided. The miniature imaging lens includes a first lens, a second lens, a third lens, a fourth lens, a fifth lens, a sixth lens and a filter, along an optical axis in order from an object side to an image side.

The first lens has a positive refractive power, and an object-side surface of the first lens is a convex surface. The second lens has a negative refractive power, and an object-side surface of the second lens is a convex surface. The third lens has a positive refractive power, an object-side surface of the third lens in a paraxial area is a convex surface, and an image-side surface of the third lens is a convex surface. The fourth lens has a negative refractive power, an object-side surface of the fourth lens is a spherical surface, and an image-side surface of the fourth lens is a convex surface. The fifth lens has a positive refractive power, an object-side surface of the fifth lens in the paraxial area is a convex surface, and an image-side surface of the fifth lens in the paraxial area is a convex surface. The sixth lens has a negative refractive power, an object-side surface of the sixth lens in the paraxial area is a concave surface, and an image-side surface of the sixth lens in the paraxial area is a concave surface.

The miniature imaging lens satisfies a conditional expression:

$$2 < f_1/R_1 < 3;$$

where $f_1$ denotes a focal length of the first lens, and $R_1$ denotes a radius of curvature of the object-side surface of the first lens.

Descriptions of symbols of main elements are as follows.

| aperture stop | S0 | first lens | L1 |
|---|---|---|---|
| second lens | L2 | third lens | L3 |
| fourth lens | L4 | fifth lens | L5 |
| sixth lens | L6 | miniature imaging lens | 100 |
| filter | G | | |

Embodiments of the present disclosure will be described in detail in the following descriptions with the accompanying drawings.

DETAILED DESCRIPTION

In order to clearly describe the present disclosure, embodiments of the present disclosure will be described in detail below with reference to the accompanying drawings. Embodiments of the present disclosure are presented in the drawings. However, the present disclosure may be implemented in many different manners, and is not limited to the embodiments described herein. Instead, embodiments are provided to make the present disclosure more comprehensive.

It should be noted that, when it is described that an element is "fixed" on the other element, it may be directly on the element, or it may also be in the element. When it is described that an element is "connected" to the other element, it may be directly connected to the other element, or it may also be indirectly connected to the other element. Terms such as "vertical", "horizontal", "left", "right", "up", "down" described herein are for convenience of description, and are not intended to indicate or imply that the device or the element should have the specific orientation, thus cannot be understood as the limitation of the present disclosure.

Embodiment 1

Figure 1:
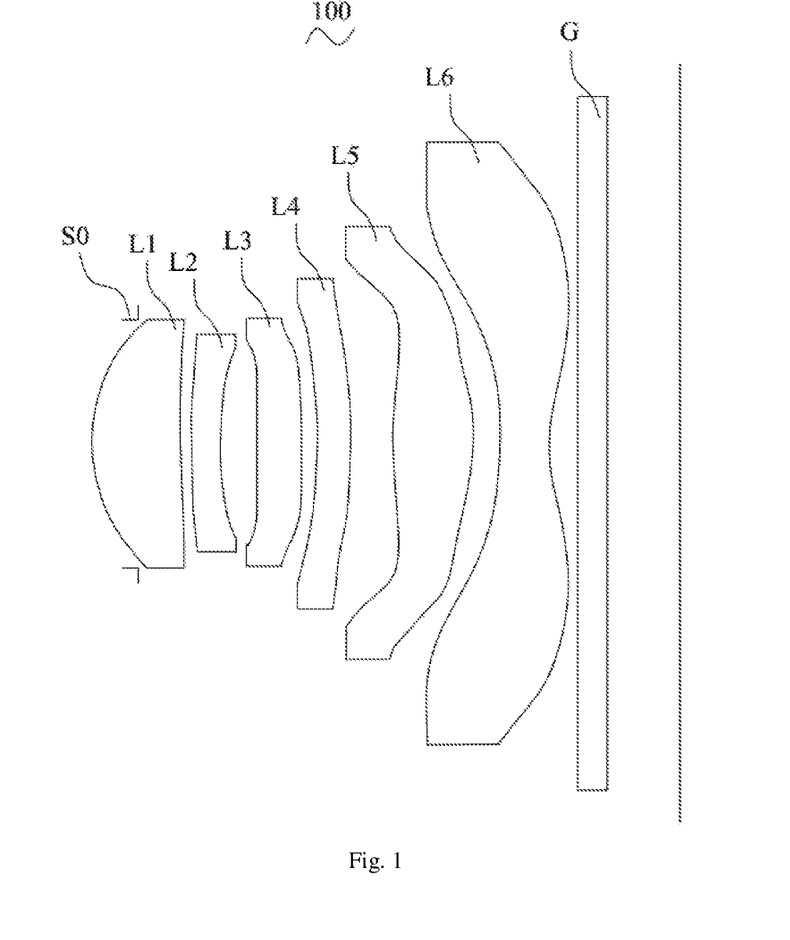
FIG. 1 is a schematic diagram of a miniature imaging lens according to a first embodiment of the present disclosure.

Referring to FIG. 1, which is a schematic diagram of a miniature imaging lens 100 according to a first embodiment of the present disclosure. As illustrated in FIG. 1, the miniature imaging lens 100 includes a first lens L1, a second lens L2, a third lens L3, a fourth lens L4, a fifth lens L5, a sixth lens L6 and a filter G, along an optical axis in order from an object side to an image side.

The first lens L1 has a positive refractive power, and an object-side surface of the first lens L1 is a convex surface. The second lens L2 has a negative refractive power, and an object-side surface of the second lens L2 is a convex surface. The third lens L3 has a positive refractive power, an object-side surface of the third lens L3 in a paraxial area is a convex surface, and an image-side surface of the third lens L3 is a convex surface. The fourth lens L4 has a negative refractive power, an object-side surface of the fourth lens L4 is a spherical surface, and an image-side surface of the fourth lens L4 is a convex surface. The fifth lens L5 has a positive refractive power, an object-side surface of the fifth lens L5 in the paraxial area is a convex surface, and an image-side surface of the fifth lens L5 in the paraxial area is a convex surface. The sixth lens L6 has a negative refractive power, an object-side surface of the sixth lens L6 in the paraxial area is a concave surface, and an image-side surface of the sixth lens L6 in the paraxial area is a concave surface.

The miniature imaging lens 100 satisfies a conditional expression:

$$2 \leq f_1/R_1 < 3; \tag{1}$$

where $f_1$ denotes a focal length of the first lens, and $R_1$ denotes a radius of curvature of the object-side surface of the first lens. When a value of $f_1/R_1$ is less than the lower limit, correction of coma may be difficult, and sensitivity of decentration may increase. When the value of $f_1/R_1$ is greater than the upper limit, the refractive power of the first lens L1 may decrease, and it may not be conducive to maintaining miniaturization of the lens. Therefore, by limitation of the conditional expression (1), the shape of the first lens L1 can be effectively defined, aberrations can be balanced, and imaging quality of the lens can be improved.

In an embodiment, the miniature imaging lens 100 further satisfies following conditional expressions:

$$10 < f_3/CT_{23} < 50; \tag{2}$$

$$-30 < R_5/R_6 < -2; \tag{3}$$

where $f_3$ denotes a focal length of the third lens, $CT_{23}$ denotes a distance between the second lens and the third lens on the optical axis, $R_5$ denotes a radius of curvature of the object-side surface of the third lens, and $R_6$ denotes a radius of curvature of the image-side surface of the third lens. By definition of the above conditional expressions (2) and (3), the curved shape of the third lens L3 can be effectively defined, miniaturization of the lens can be achieved, aberrations can be balanced, and resolution of the miniature imaging lens 100 can be improved.

In detail, in the above conditional expression (2), when a value of $f_3/CT_{23}$ is less than the lower limit, sensitivity of decentration of the lens may increase. When the value of $f_3/CT_{23}$ is greater than the upper limit, correction of the field curvature and coma of the lens may be difficult, and it may not be conducive to maintaining miniaturization of the lens.

In the above conditional expression (3), when a value of $R_5/R_6$ is less than the lower limit, the refractive power of the third lens L3 may increase, which may not be conducive to ensuring performance of edge field of view, and sensitivity of decentration may increase. When the value of $R_5/R_6$ is greater than the upper limit, correction of the field curvature may be difficult.

In an embodiment, the miniature imaging lens 100 satisfies a conditional expression:

$$-0.3 < R_{10}/R_9 < 0; \tag{4}$$

where $R_9$ denotes a paraxial radius of curvature of the object-side surface of the fifth lens, and $R_{10}$ denotes a paraxial radius of curvature of the image-side surface of the fifth lens. When a value of $R_{10}/R_9$ is less than the lower limit, for extra axis rays, high-order aberrations may occur, and performance may deteriorate. When the value of $R_{10}/R_9$ is greater than the upper limit, correction of the field curvature and coma may be difficult, and sensitivity of decentration may increase. Therefore, by definition of the above conditional expression (4), the curved shape of the fifth lens L5 can be effectively defined, and aberrations can be balanced.

In an embodiment, the miniature imaging lens 100 satisfies a conditional expression:

$$-0.55 \leq f_6/f < -0.45; \tag{5}$$

where $f_6$ denotes a focal length of the sixth lens, and f denotes a focal length of the miniature imaging lens. When a value of $f_6/f$ is less than the lower limit, sensitivity of decentration of the lens may increase. When the value of $f_6/f$ is greater than the upper limit, the refractive power of the sixth lens L6 may increase, and correction of the field curvature may be difficult.

In an embodiment, the miniature imaging lens 100 satisfies a conditional expression:

$$7 < |f_2/f| + |f_3/f| + |f_4/f| < 10; \tag{6}$$

where $f_2$ denotes a focal length of the second lens, $f_3$ denotes a focal length of the third lens, $f_4$ denotes a focal length of the fourth lens, and f denotes a focal length of the miniature imaging lens. When a value of $|f_2/f| + |f_3/f| + |f_4/f|$ is less than the lower limit, the refractive power of one of the second lens L2, the third lens L3 and the fourth lens L4 may increase, and sensitivity of decentration may increase. When the value of $|f_2/f| + |f_3/f| + |f_4/f|$ is greater than the upper limit, the refractive power may decrease, which may not be conducive to maintaining miniaturization of the lens.

In an embodiment, the miniature imaging lens 100 satisfies a conditional expression:

$$-0.08 < CT_{56}/f_{56} < 0; \tag{7}$$

where $CT_{56}$ denotes a distance between the fifth lens and the sixth lens on the optical axis, and $f_{56}$ denotes a combined focal length of the fifth lens and the sixth lens. When a value of $CT_{56}/f_{56}$ is less than the lower limit, it may not be conducive to suppressing the incident angle from an imaging surface. When a value of $CT_{56}/f_{56}$ is greater than the upper limit, correction of optical distortion may be difficult, and it may not be conducive to maintaining miniaturization of the lens.

In at least one embodiment, the miniature imaging lens 100 further includes an aperture stop S0, and the aperture stop S0 is disposed in front of the first lens L1. The aperture stop S0 is configured to reduce stray light and improve imaging quality of the lens. The Fno of the miniature imaging lens 100 is less than 2.0, which allows the lens to have a large aperture, and even in the case of insufficient light, high-definition imaging quality of the lens can also be ensured.

In addition, in an embodiment, the first lens, the second lens, the third lens, the fifth lens and the sixth lens are made of plastic aspherical lenses, and an aspherical surface of each lens satisfies a formula:

$$z = \frac{ch^2}{1 + \sqrt{1 - (1+k)c^2 h^2}} + \sum A_{2i} h^{2i};$$

where z denotes a distance rise between a point the aspheric surface with a height h along the optical axis and an apex of the aspherical surface, c denotes a paraxial radius of curvature of the aspherical surface, k denotes a conic coefficient, and $A_{2i}$ denotes a coefficient of $2i^{nd}$ order of the aspherical surface.

The present disclosure will further be described below with the following various embodiments. In each of the following embodiments, the thickness, the radius of curvature and the material of each lens in the miniature imaging lens are different, reference may be made to the parameter table in each embodiment. The following embodiments are merely alternative embodiments of the present disclosure. However, embodiments of the present disclosure are not limited by the following embodiments, and changes, alternatives, combinations or simplifications made without departing from innovations of the present disclosure should be considered as equivalent alternatives, and should be included in the protection scope of the present disclosure.

Figure 2:
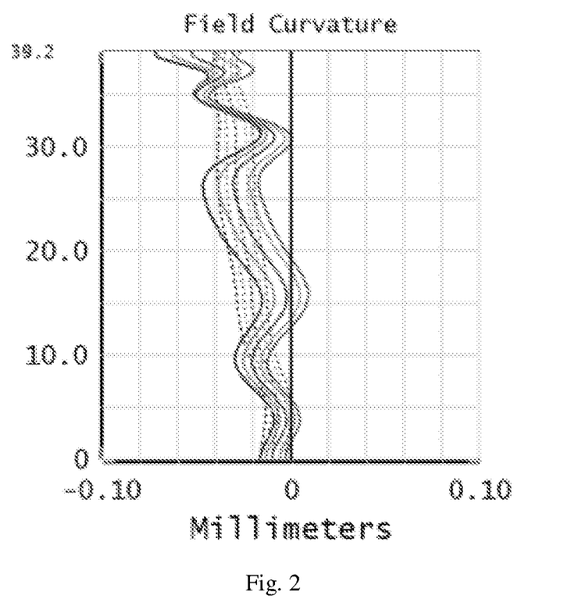
FIG. 2 is a schematic diagram showing a field curvature curve of a miniature imaging lens according to a first embodiment of the present disclosure.
Figure 3:
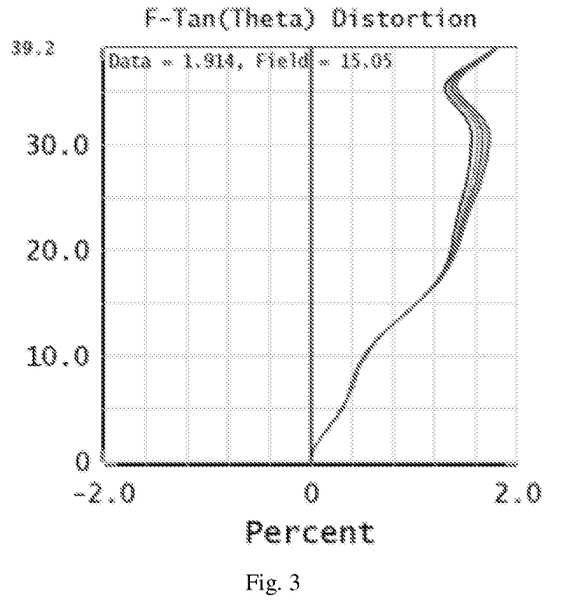
FIG. 3 is a schematic diagram showing a distortion curve of a miniature imaging lens according to a first embodiment of the present disclosure.
Figure 4:
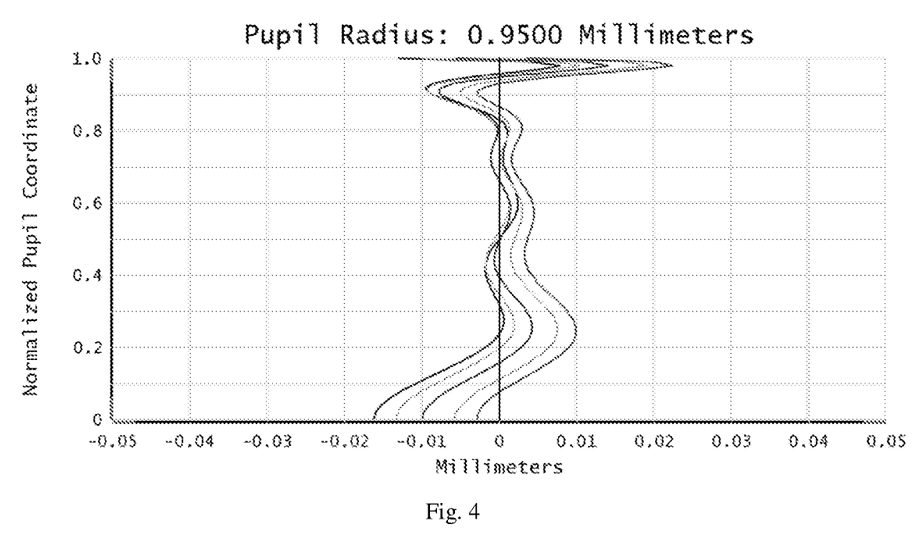
FIG. 4 is a schematic diagram showing a longitudinal aberration curve of a miniature imaging lens according to a first embodiment of the present disclosure.

In this embodiment, a field curvature curve of the miniature imaging lens 100 is illustrated in FIG. 2, a distortion curve of the miniature imaging lens 100 is illustrated in FIG. 3, and a longitudinal aberration curve of the miniature imaging lens 100 is illustrated in FIG. 4.

In detail, in an embodiment, design parameters of the miniature imaging lens 100 are shown in Table 1.

TABLE 1

| No. of surface | Surface type | Curvature radius | Thickness | Refractive index | Abbe number |
|---|---|---|---|---|---|
| object side | object side | spherical | infinity | infinity | |
| S0 | aperture stop | spherical | infinity | −0.374 | — | — |
| S1 | first lens | aspheric | 1.3498 | 0.6248 | 1.54 | 56 |
| S2 | | aspheric | 5.7551 | 0.0783 | | |
| S3 | second lens | aspheric | 5.6379 | 0.2037 | 1.66 | 20.4 |
| S4 | | aspheric | 2.7124 | 0.2563 | | |
| S5 | third lens | aspheric | 31.0736 | 0.3219 | 1.54 | 56 |
| S6 | | aspheric | −6.0826 | 0.1090 | | |
| S7 | fourth lens | spherical | −4.1489 | 0.2299 | 1.66 | 20.4 |
| S8 | | aspheric | −11.5835 | 0.3089 | | |
| S9 | fifth lens | aspheric | 6.8446 | 0.5619 | 1.54 | 56 |
| S10 | | aspheric | −1.4302 | 0.1874 | | |
| S11 | sixth lens | aspheric | −3.4868 | 0.3507 | 1.53 | 55.7 |
| S12 | | aspheric | 1.2909 | 0.2000 | | |
| S13 | filter | spherical | infinity | 0.2100 | 1.52 | 64.2 |
| S14 | | spherical | infinity | 0.5071 | | |
| S15 | image side | spherical | infinity | — | | |

In this embodiment, aspherical parameters of each lens in the miniature imaging lens 100 are shown in Table 2.

TABLE 2

| No. of surface | k | $A_4$ | $A_6$ | $A_8$ | $A_{10}$ | $A_{12}$ | $A_{14}$ | $A_{16}$ | $A_{18}$ | $A_{20}$ |
|---|---|---|---|---|---|---|---|---|---|---|
| S1 | 0.1167 | −2.772E−02 | 1.871E−01 | −9.852E−01 | 2.968E+00 | −5.391E+00 | 5.671E+00 | −3.193E+00 | 7.264E−01 | 0.000E+00 |
| S2 | 32.1128 | −1.907E−01 | 2.189E−01 | 1.235E−01 | −1.880E+00 | 5.518E+00 | −8.768E+00 | 7.315E+00 | −2.516E+00 | 0.000E+00 |
| S3 | 26.5986 | −2.928E−01 | 5.555E−01 | −2.752E−01 | −7.514E−01 | 2.069E+00 | −2.773E+00 | 2.344E+00 | −9.292E−01 | 0.000E+00 |
| S4 | 8.0536 | −1.670E−01 | 6.926E−02 | 1.898E+00 | −8.152E+00 | 1.673E+01 | −1.690E+01 | 5.076E+00 | 2.630E+00 | 0.000E+00 |
| S5 | 0.0000 | −9.649E−02 | −1.962E−01 | −4.647E−01 | 5.231E+00 | −2.293E+01 | 5.244E+01 | −6.273E+01 | 3.121E+01 | 0.000E+00 |
| S6 | 0.0000 | −1.050E−02 | 1.376E−01 | −1.740E+00 | 5.385E+00 | −1.042E+01 | 1.245E+01 | −8.507E+00 | 2.666E+00 | 0.000E+00 |
| S8 | 66.8487 | −1.143E−01 | 1.064E−01 | −2.557E−01 | 4.985E−01 | −3.524E−01 | 4.157E−02 | 4.925E−02 | −1.522E−02 | 0.000E+00 |
| S9 | 10.0000 | 2.886E−02 | −1.037E−01 | 1.782E−01 | −6.861E−01 | 1.128E+00 | −1.036E+00 | 5.369E−01 | −1.423E−01 | 1.476E−02 |
| S10 | −17.0955 | −1.152E−01 | 6.697E−01 | −1.229E+00 | 1.173E+00 | −6.967E−01 | 2.546E−01 | −5.141E−02 | 4.342E−03 | 0.000E+00 |
| S11 | 0.5651 | −1.026E−01 | 4.370E−02 | −1.776E−03 | 6.089E−04 | −8.778E−04 | 2.104E−04 | −1.541E−05 | 0.000E+00 | 0.000E+00 |
| S12 | −11.1245 | −1.137E−01 | 5.195E−02 | −2.151E−02 | 7.967E−03 | −2.096E−03 | 2.956E−04 | −1.625E−05 | 0.000E+00 | 0.000E+00 |

Embodiment 2

Figure 5:
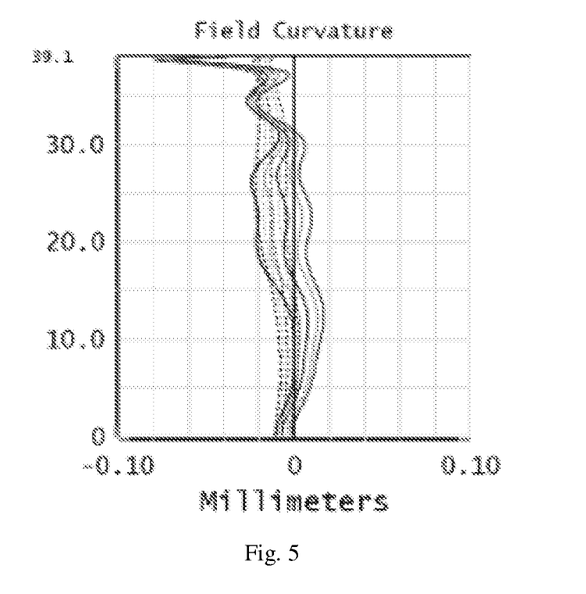
FIG. 5 is a schematic diagram showing a field curvature curve of a miniature imaging lens according to a second embodiment of the present disclosure.
Figure 6:
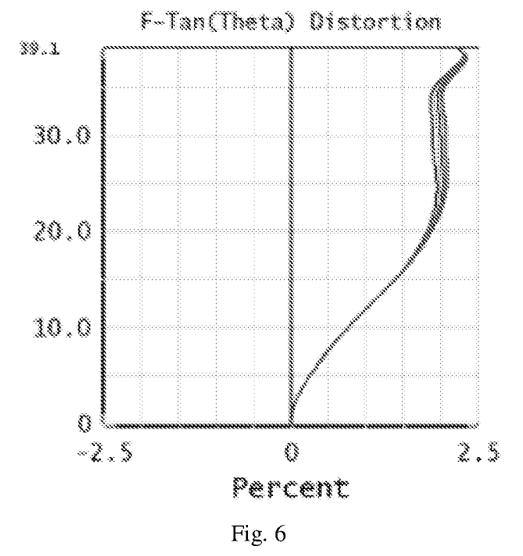
FIG. 6 is a schematic diagram showing a distortion curve of a miniature imaging lens according to a second embodiment of the present disclosure.
Figure 7:
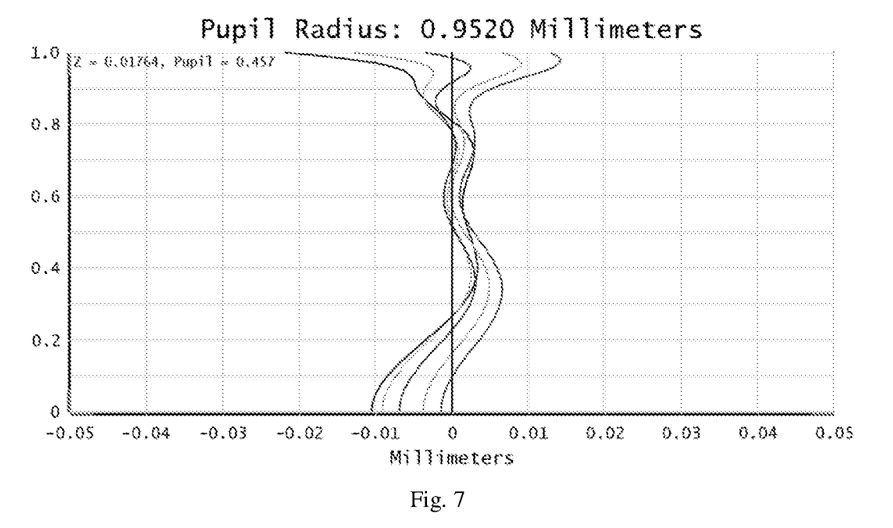
FIG. 7 is a schematic diagram showing a longitudinal aberration curve of a miniature imaging lens according to a second embodiment of the present disclosure.

The structure of the miniature imaging lens 100 in embodiment 2 is substantially the same as that of embodiment 1, and the difference lies in the design parameters. In detail, design parameters of the miniature imaging lens 100 in this embodiment are shown in Table 3. In this embodiment, a field curvature curve of the miniature imaging lens 100 is illustrated in FIG. 5, a distortion curve of the miniature imaging lens 100 is illustrated in FIG. 6, and a longitudinal aberration curve of the miniature imaging lens 100 is illustrated in FIG. 7.

TABLE 3

| No. of surface | | Surface type | Curvature radius | Thickness | Refractive index | Abbe number |
|---|---|---|---|---|---|---|
| object side | object side | spherical | infinity | infinity | | |
| S0 | aperture stop | spherical | infinity | −0.388 | — | — |
| S1 | first lens | spherical | 1.3129 | 0.6273 | 1.54 | 56 |
| S2 | | aspheric | 6.1485 | 0.0752 | | |
| S3 | second lens | aspheric | 5.6859 | 0.2200 | 1.66 | 20.4 |
| S4 | | aspheric | 2.5220 | 0.2246 | | |
| S5 | third lens | aspheric | 85.1283 | 0.2917 | 1.54 | 56 |
| S6 | | aspheric | −4.7631 | 0.0790 | | |
| S7 | fourth lens | spherical | −4.4648 | 0.2307 | 1.66 | 20.4 |
| S8 | | aspheric | −12.9512 | 0.3427 | | |
| S9 | fifth lens | aspheric | 10.7984 | 0.6029 | 1.54 | 56 |
| S10 | | aspheric | −1.4275 | 0.1184 | | |
| S11 | sixth lens | aspheric | −4.1032 | 0.3964 | 1.53 | 55.7 |
| S12 | | aspheric | 1.2652 | 0.2000 | | |
| S13 | filter | spherical | infinity | 0.2100 | 1.52 | 64.2 |
| S14 | | spherical | infinity | 0.3598 | | |
| S15 | image side | spherical | infinity | −0.388 | | |

In this embodiment, aspherical parameters of each lens in the miniature imaging lens 100 are shown in Table 4.

TABLE 4

| No. of surface | k | $A_4$ | $A_6$ | $A_8$ | $A_{10}$ | $A_{12}$ | $A_{14}$ | $A_{16}$ | $A_{18}$ | $A_{20}$ |
|---|---|---|---|---|---|---|---|---|---|---|
| S1 | 0.1124 | −9.340E−03 | −8.422E−03 | 6.225E−02 | −2.290E−01 | 2.899E−01 | −1.595E−01 | 0.000E+00 | 0.000E+00 | 0.000E+00 |
| S2 | 35.1140 | −1.924E−01 | 2.967E−01 | −3.819E−01 | 2.663E−01 | −1.288E−01 | 0.000E+00 | 0.000E+00 | 0.000E+00 | 0.000E+00 |
| S3 | 32.2921 | −2.839E−01 | 6.151E−01 | −6.667E−01 | 4.130E−01 | −8.878E−02 | 0.000E+00 | 0.000E+00 | 0.000E+00 | 0.000E+00 |
| S4 | 7.6913 | −1.792E−01 | 3.867E−01 | −3.632E−01 | 9.543E−02 | 5.039E−02 | 0.000E+00 | 0.000E+00 | 0.000E+00 | 0.000E+00 |
| S5 | 0.0000 | −1.262E−01 | 4.284E−02 | −1.144E+00 | 3.139E+00 | −4.881E+00 | 2.870E+00 | 0.000E+00 | 0.000E+00 | 0.000E+00 |
| S6 | 0.0000 | 5.813E−02 | −2.911E−01 | 5.745E−01 | −2.631E+00 | 5.461E+00 | −5.703E+00 | 2.504E+00 | 0.000E+00 | 0.000E+00 |
| S8 | 66.8470 | −1.412E−01 | 1.674E−01 | −4.577E−01 | 1.060E+00 | −1.094E+00 | 5.188E−01 | −9.380E−02 | 0.000E+00 | 0.000E+00 |
| S9 | 10.0000 | 1.913E−02 | −1.773E−01 | 4.209E−01 | −1.211E+00 | 1.851E+00 | −1.643E+00 | 8.553E−01 | −2.383E−01 | 2.719E−02 |
| S10 | −13.1370 | 2.924E−02 | 2.292E−01 | −4.964E−01 | 4.293E−01 | −2.142E−01 | 6.594E−02 | −1.160E−02 | 8.821E−04 | 0.000E+00 |
| S11 | 1.9437 | −8.438E−02 | 4.123E−02 | −5.220E−03 | 3.195E−03 | −1.812E−03 | 3.818E−04 | −2.775E−05 | 0.000E+00 | 0.000E+00 |
| S12 | −10.3010 | −1.260E−01 | 7.375E−02 | −3.897E−02 | 1.481E−02 | −3.561E−03 | 4.663E−04 | −2.483E−05 | 0.000E+00 | 0.000E+00 |

Embodiment 3

Figure 8:
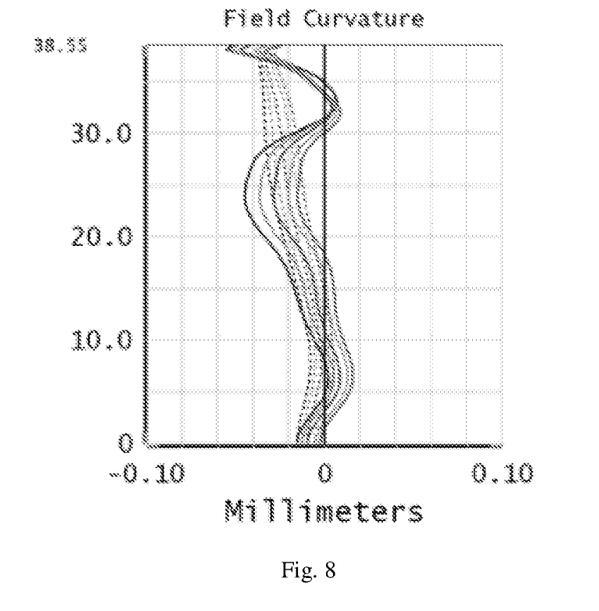
FIG. 8 is a schematic diagram showing a field curvature curve of a miniature imaging lens according to a third embodiment of the present disclosure.
Figure 9:
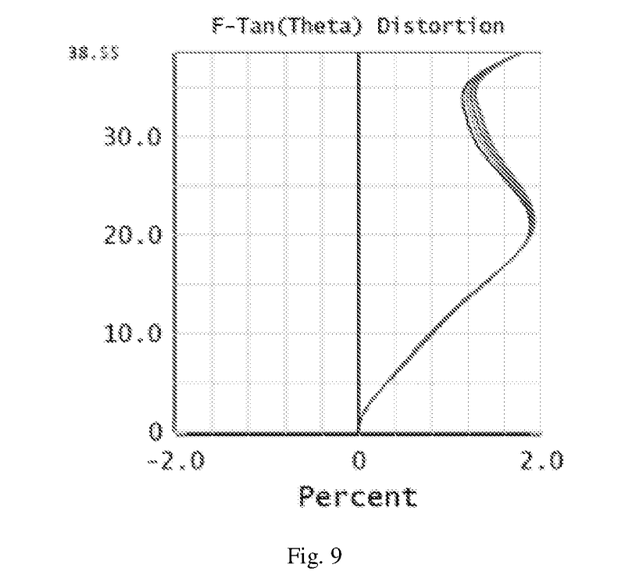
FIG. 9 is a schematic diagram showing a distortion curve of a miniature imaging lens according to a third embodiment of the present disclosure.
Figure 10:
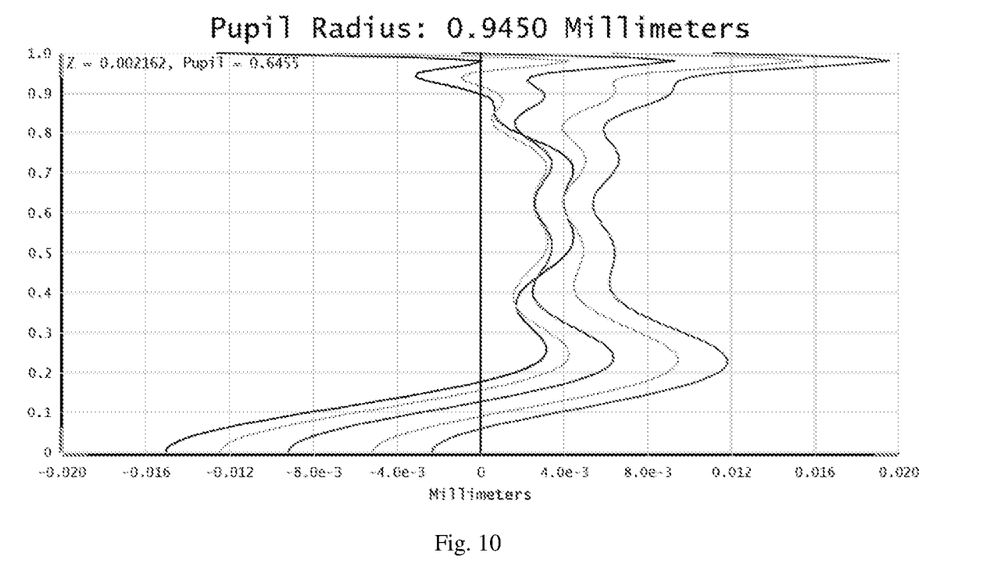
FIG. 10 is a schematic diagram showing a longitudinal aberration curve of a miniature imaging lens according to a third embodiment of the present disclosure.

The structure of the miniature imaging lens 100 in embodiment 3 is substantially the same as that of embodiment 1, and the difference lies in the design parameters. In detail, design parameters of the miniature imaging lens 100 in this embodiment are shown in Table 5. In this embodiment, a field curvature curve of the miniature imaging lens 100 is illustrated in FIG. 8, a distortion curve of the miniature imaging lens 100 is illustrated in FIG. 9, and a longitudinal aberration curve of the miniature imaging lens 100 is illustrated in FIG. 10.

TABLE 5

| No. of surface | | Surface type | Curvature radius | Thickness | Refractive index | Abbe number |
|---|---|---|---|---|---|---|
| object side | object side | spherical | infinity | infinity | | |
| S0 | aperture stop | spherical | infinity | −0.389 | — | — |
| S1 | first lens | spherical | 1.3255 | 0.6286 | 1.54 | 56 |
| S2 | | aspheric | 6.4744 | 0.0539 | | |
| S3 | second lens | aspheric | 5.8891 | 0.2200 | 1.66 | 20.4 |
| S4 | | aspheric | 2.6386 | 0.2580 | | |

TABLE 5-continued

| No. of surface | Surface type | Curvature radius | Thickness | Refractive index | Abbe number |
|---|---|---|---|---|---|
| S5 | third lens | aspheric | 27.5171 | 0.2881 | 1.54 | 56 |
| S6 | | aspheric | −7.0639 | 0.0556 | | |
| S7 | fourth lens | spherical | −5.0177 | 0.2300 | 1.66 | 20.4 |
| S8 | | aspheric | −13.5142 | 0.3243 | | |
| S9 | fifth lens | aspheric | 63.8626 | 0.5800 | 1.54 | 56 |
| S10 | | aspheric | −1.2799 | 0.1671 | | |
| S11 | sixth lens | aspheric | −4.0300 | 0.4006 | 1.53 | 55.7 |
| S12 | | aspheric | 1.2647 | 0.2000 | | |
| S13 | filter | spherical | infinity | 0.2100 | 1.52 | 64.2 |
| S14 | | spherical | infinity | 0.3598 | | |
| S15 | image side | spherical | infinity | — | | |

In this embodiment, aspherical parameters of each lens in the miniature imaging lens 100 are shown in Table 6.

TABLE 6

| No. of surface | k | $A_4$ | $A_6$ | $A_8$ | $A_{10}$ | $A_{12}$ | $A_{14}$ | $A_{16}$ | $A_{18}$ | $A_{20}$ |
|---|---|---|---|---|---|---|---|---|---|---|
| S1 | 0.2674 | −4.198E−02 | 3.772E−01 | −2.704E+00 | 1.113E+01 | −2.833E+01 | 4.485E+01 | −4.311E+01 | 2.302E+01 | −5.249E+00 |
| S2 | 48.7316 | −2.671E−01 | 1.028E+00 | −5.940E+00 | 2.966E+01 | −9.801E+01 | 2.013E+02 | −2.485E+02 | 1.690E+02 | −4.871E+01 |
| S3 | 39.5009 | −3.304E−01 | 9.991E−01 | −3.767E+00 | 1.840E+01 | −6.677E+01 | 1.509E+02 | −2.030E+02 | 1.495E+02 | −4.651E+01 |
| S4 | 7.1200 | −1.549E−01 | 9.152E−03 | 4.335E+00 | −3.385E+01 | 1.488E+02 | −4.066E+02 | 6.766E+02 | −6.264E+02 | 2.480E+02 |
| S5 | 91.5481 | −1.513E−01 | 3.811E−01 | −4.451E+00 | 2.111E+01 | −6.149E+01 | 1.041E+02 | −8.881E+01 | 1.638E+01 | 1.799E+01 |
| S6 | −81.9861 | −1.810E−02 | 2.189E−01 | −2.838E+00 | 1.229E+01 | −3.592E+01 | 6.673E+01 | −7.509E+01 | 4.649E+01 | −1.185E+01 |
| S8 | 66.8470 | −1.079E−01 | 1.694E−02 | 2.502E−01 | −1.361E+00 | 3.859E+00 | −5.425E+00 | 4.046E+00 | −1.556E+00 | 2.443E−01 |
| S9 | 10.0000 | 2.964E−02 | 4.539E−02 | −4.528E−01 | 7.186E−01 | −7.384E−01 | 4.026E−01 | −6.642E−02 | −1.926E−02 | 5.878E−03 |
| S10 | −10.0271 | −2.435E−02 | 3.490E−01 | −6.060E−01 | 5.277E−01 | −3.272E−01 | 1.513E−01 | −4.609E−02 | 7.823E−03 | −5.493E−04 |
| S11 | 2.2940 | −8.339E−02 | 3.921E−02 | −3.972E−03 | 1.223E−03 | 6.285E−05 | −5.516E−04 | 2.301E−04 | −3.745E−05 | 2.250E−06 |
| S12 | −9.7458 | −1.329E−01 | 9.055E−02 | −5.611E−02 | 2.187E−02 | −4.567E−03 | 3.084E−04 | 5.117E−05 | −1.017E−05 | 4.960E−07 |

Embodiment 4

Figure 11:
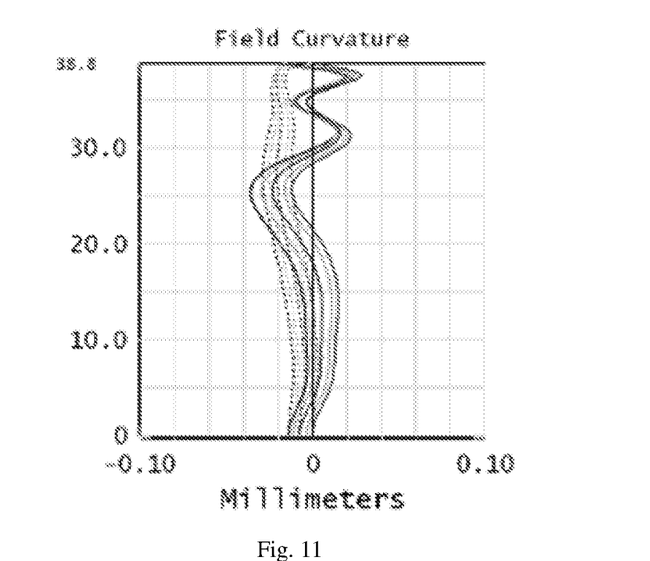
FIG. 11 is a schematic diagram showing a field curvature curve of a miniature imaging lens according to a fourth embodiment of the present disclosure.
Figure 12:
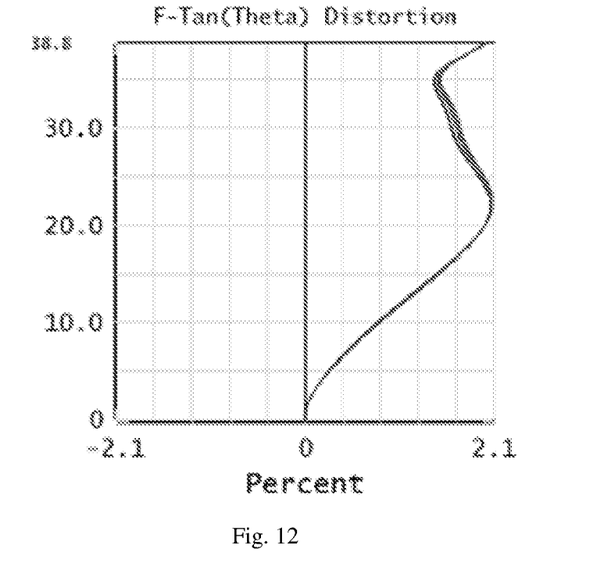
FIG. 12 is a schematic diagram showing a distortion curve of a miniature imaging lens according to a fourth embodiment of the present disclosure.
Figure 13:
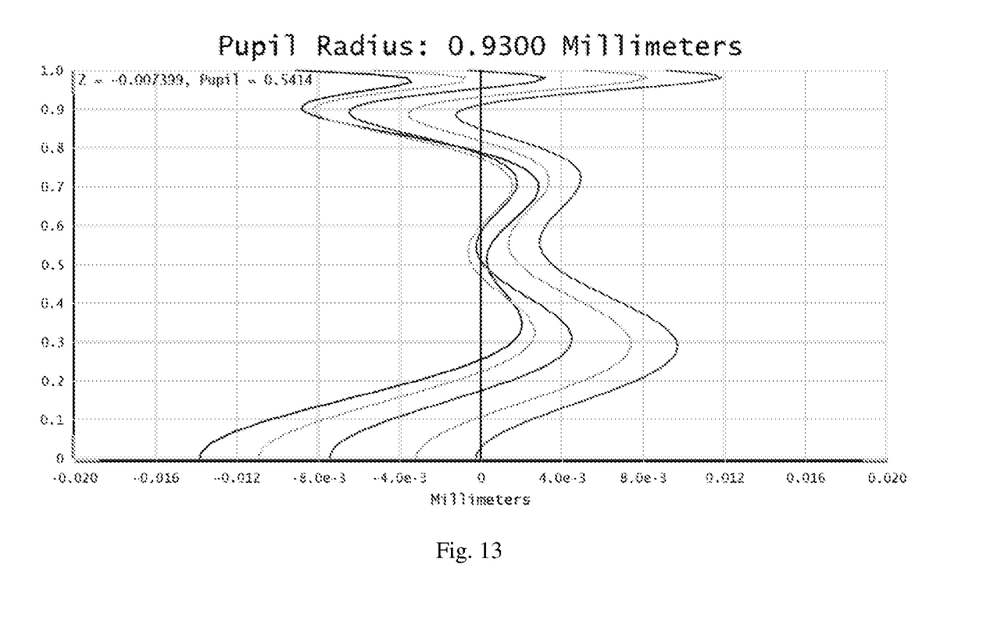
FIG. 13 is a schematic diagram showing a longitudinal aberration curve of a miniature imaging lens according to a fourth embodiment of the present disclosure.

The structure of the miniature imaging lens 100 in embodiment 4 is substantially the same as that of embodiment 1, and the difference lies in the design parameters. In detail, design parameters of the miniature imaging lens 100 in this embodiment are shown in Table 7. In this embodiment, a field curvature curve of the miniature imaging lens 100 is illustrated in FIG. 11, a distortion curve of the miniature imaging lens 100 is illustrated in FIG. 12, and a longitudinal aberration curve of the miniature imaging lens 100 is illustrated in FIG. 13.

TABLE 7

| No. of surface | | Surface type | Curvature radius | Thickness | Refractive index | Abbe number |
|---|---|---|---|---|---|---|
| object side | object side | spherical | infinity | infinity | | |
| S0 | aperture stop | spherical | infinity | −0.357 | — | — |
| S1 | first lens | spherical | 1.3230 | 0.5922 | 1.54 | 56 |
| S2 | | aspheric | 6.3256 | 0.0489 | | |
| S3 | second lens | aspheric | 5.6162 | 0.2200 | 1.66 | 20.4 |
| S4 | | aspheric | 2.6061 | 0.2593 | | |
| S5 | third lens | aspheric | 23.2371 | 0.2738 | 1.54 | 56 |
| S6 | | aspheric | −7.6511 | 0.0638 | | |
| S7 | fourth lens | spherical | −5.2903 | 0.2401 | 1.65 | 21.5 |
| S8 | | aspheric | −15.8598 | 0.3260 | | |
| S9 | fifth lens | aspheric | 33.1503 | 0.5800 | 1.54 | 56 |
| S10 | | aspheric | −1.2879 | 0.1459 | | |
| S11 | sixth lens | aspheric | −3.9213 | 0.3999 | 1.53 | 55.7 |
| S12 | | aspheric | 1.2970 | 0.2000 | | |
| S13 | filter | spherical | infinity | 0.2100 | 1.52 | 64.2 |
| S14 | | spherical | infinity | 0.3598 | | |
| S15 | image side | spherical | infinity | — | | |

In this embodiment, aspherical parameters of each lens in the miniature imaging lens 100 are shown in Table 8.

TABLE 8

| No. of surface | k | $A_4$ | $A_6$ | $A_8$ | $A_{10}$ | $A_{12}$ | $A_{14}$ | $A_{16}$ | $A_{18}$ | $A_{20}$ |
|---|---|---|---|---|---|---|---|---|---|---|
| S1 | 0.2552 | −1.652E−02 | 4.901E−03 | 3.071E−02 | −2.197E−01 | 3.401E−01 | −2.035E−01 | 0.000E+00 | 0.000E+00 | 0.000E+00 |
| S2 | 45.5178 | −2.310E−01 | 4.495E−01 | −4.883E−01 | −3.528E−02 | 4.689E−01 | −3.482E−01 | 0.000E+00 | 0.000E+00 | 0.000E+00 |
| S3 | 38.3069 | −3.076E−01 | 7.590E−01 | −1.078E+00 | 8.536E−01 | −3.137E−01 | 0.000E+00 | 0.000E+00 | 0.000E+00 | 0.000E+00 |
| S4 | 7.3948 | −1.344E−01 | −2.561E−02 | 3.026E+00 | −1.619E+01 | 4.217E+01 | −5.613E+01 | 3.070E+01 | 0.000E+00 | 0.000E+00 |
| S5 | 91.5481 | −8.854E−02 | −6.102E−01 | 3.395E+00 | −1.615E+01 | 4.280E+01 | −6.056E+01 | 3.543E+01 | 0.000E+00 | 0.000E+00 |
| S6 | −81.9861 | 4.862E−02 | −7.289E−01 | 2.847E+00 | −9.710E+00 | 1.830E+01 | −1.838E+01 | 7.859E+00 | 0.000E+00 | 0.000E+00 |
| S8 | 66.8470 | −1.427E−01 | 3.591E−01 | −1.232E+00 | 2.697E+00 | −3.051E+00 | 1.848E+00 | −5.724E−01 | 7.038E−02 | 0.000E+00 |
| S9 | 10.0000 | 2.616E−02 | −9.483E−03 | −2.964E−02 | −5.036E−01 | 1.172E+00 | −1.322E+00 | 8.253E−01 | −2.637E−01 | 3.336E−02 |
| S10 | −9.8540 | −9.251E−03 | 3.054E−01 | −4.681E−01 | 2.874E−01 | −8.607E−02 | 8.263E−03 | 3.162E−03 | −1.245E−03 | 1.399E−04 |
| S11 | 2.3655 | −9.087E−02 | 3.937E−02 | −2.034E−03 | 7.211E−04 | −6.855E−04 | 1.303E−04 | −5.386E−06 | 0.000E+00 | 0.000E+00 |
| S12 | −10.4930 | −1.221E−01 | 4.969E−02 | −1.336E−03 | −2.061E−02 | 1.599E−02 | −5.984E−03 | 1.234E−03 | −1.347E−04 | 6.139E−06 |

In addition, Table 9 shows the above 4 embodiments and their corresponding optical characteristics, including the focal length f, the f-number Fno, the total optical length $T_L$ of the miniature imaging lens 100, and values corresponding to the preceding conditional expressions (1)-(7).

TABLE 9

| Conditional expression | Embodiment 1 | Embodiment 2 | Embodiment 3 | Embodiment 4 |
|---|---|---|---|---|
| f (mm) | 3.4819 | 3.5301 | 3.5001 | 3.5287 |
| Fno | 1.8439 | 1.8628 | 1.8669 | 1.9524 |
| $T_L$ (mm) | 4.1500 | 4.1500 | 4.1473 | 4.1505 |
| $f_1/R_1$ | 2.2773 | 2.2639 | 2.2066 | 2.2218 |
| $f_3/CT_{23}$ | 34.4863 | 47.4937 | 39.9996 | 40.8096 |
| $R_5/R_6$ | −5.0186 | −17.8726 | −3.8955 | −3.0371 |
| $R_{10}/R_9$ | −0.2090 | −0.2496 | −0.0200 | −0.0388 |
| $f_6/f$ | −0.4917 | −0.4919 | −0.4994 | −0.5013 |
| $\|f_2/f\| + \|f_3/f\| + \|f_4/f\|$ | 7.8153 | 8.2994 | 8.5081 | 8.5818 |
| $CT_{56}/f_{56}$ | −0.0268 | −0.0337 | −0.0537 | −0.0434 |

With the miniature imaging lens 100, by reasonably matching shapes and focal power of the first lens L1, the second lens L2, the third lens L3, the fourth lens L4, the fifth lens L5 and the sixth lens L6, the size of the miniature imaging lens 100 can be effectively reduced, and clear imaging effect of large aperture can be achieved. In detail, the miniature imaging lens 100 adopts six plastic lenses, the size of the lens is small, the structure is compact, and the aperture is large, which can provide better optical imaging quality, and can be applicable for portable electronic devices.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

The above-mentioned embodiments only express several implementations of the present disclosure, and descriptions thereof are more specific and detailed, but are not to be construed as limitation the scope of the present disclosure. It should be noted that, for those skilled in the art, various variations and modifications can be made without departing from the spirit of the present disclosure, all of which belong to the scope of the present disclosure. Therefore, the scope of the present disclosure is determined by the appended claims.

What is claimed is:

1. A miniature imaging lens comprising, along an optical axis in order from an object side to an image side:
   a first lens having a positive refractive power, an object-side surface of the first lens being a convex surface;
   a second lens having a negative refractive power, an object-side surface of the second lens being a convex surface;
   a third lens having a positive refractive power, an object-side surface of the third lens in a paraxial area being a convex surface, and an image-side surface of the third lens being a convex surface;
   a fourth lens having a negative refractive power, an object-side surface of the fourth lens being a spherical surface, and an image-side surface of the fourth lens being a convex surface;
   a fifth lens having a positive refractive power, an object-side surface of the fifth lens in the paraxial area being a convex surface, and an image-side surface of the fifth lens in the paraxial area being a convex surface;
   a sixth lens having a negative refractive power, an object-side surface of the sixth lens in the paraxial area being a concave surface, and an image-side surface of the sixth lens in the paraxial area being a concave surface; and
   a filter;
   wherein the miniature imaging lens satisfies a conditional expression:

$2 < f_1/R_1 < 3$;

where $f_1$ denotes a focal length of the first lens, and $R_1$ denotes a radius of curvature of the object-side surface of the first lens.

2. The miniature imaging lens according to claim 1, wherein the miniature imaging lens satisfies following conditional expressions:

$10 < f_3/CT_{23} < 50$;

$-30 < R_5/R_6 < -2$;

where $f_3$ denotes a focal length of the third lens, $CT_{23}$ denotes a distance between the second lens and the third lens on the optical axis, $R_5$ denotes a radius of curvature of the object-side surface of the third lens, and $R_6$ denotes a radius of curvature of the image-side surface of the third lens.

3. The miniature imaging lens according to claim 1, wherein the miniature imaging lens satisfies a conditional expression:

$$-0.3 < R_{10}/R_9 < 0;$$

where $R_9$ denotes a paraxial radius of curvature of the object-side surface of the fifth lens, and $R_{10}$ denotes a paraxial radius of curvature of the image-side surface of the fifth lens.

4. The miniature imaging lens according to claim 1, wherein the miniature imaging lens satisfies a conditional expression:

$$-0.55 < f_6/f < -0.45;$$

where $f_6$ denotes a focal length of the sixth lens, and $f$ denotes a focal length of the miniature imaging lens.

5. The miniature imaging lens according to claim 1, wherein the miniature imaging lens satisfies a conditional expression:

$$7 < |f_2/f| + |f_3/f| + |f_4/f| < 10;$$

where $f_2$ denotes a focal length of the second lens, $f_3$ denotes a focal length of the third lens, $f_4$ denotes a focal length of the fourth lens, and $f$ denotes a focal length of the miniature imaging lens.

6. The miniature imaging lens according to claim 1, wherein the miniature imaging lens satisfies a conditional expression:

$$-0.08 < CT_{56}/f_{56} < 0;$$

where $CT_{56}$ denotes a distance between the fifth lens and the sixth lens on the optical axis, and $f_{56}$ denotes a combined focal length of the fifth lens and the sixth lens.

7. The miniature imaging lens according to claim 1, wherein the miniature imaging lens further comprises an aperture stop disposed in front of the first lens.

8. The miniature imaging lens according to claim 1, wherein the f-number Fno of the miniature imaging lens is less than 2.0.

9. The miniature imaging lens according to claim 1, wherein the first lens, the second lens, the third lens, the fifth lens and the sixth lens are made of plastic aspherical lenses.

10. The miniature imaging lens according to claim 9, wherein an aspherical surface of each lens satisfies a formula:

$$z = \frac{ch^2}{1 + \sqrt{1 - (1+k)c^2 h^2}} + \sum A_{2i} h^{2i};$$

where z denotes a distance rise between a point the aspheric surface with a height h along the optical axis and an apex of the aspherical surface, c denotes a paraxial radius of curvature of the aspherical surface, k denotes a conic coefficient, and $A_{2i}$ denotes a coefficient of $2i^{nd}$ order of the aspherical surface.

* * * * *